July 11, 1967 K. JASMAND 3,330,605
SEAL WITH BEARING AND GUIDING SECTIONS
Filed Oct. 19, 1964

Inventor:
Karl Jasmand

United States Patent Office 3,330,605
Patented July 11, 1967

3,330,605
SEAL WITH BEARING AND GUIDING SECTIONS
Karl Jasmand, Heilbronn (Neckar), Germany, assignor to Kupfer-Asbest-Co. Gustav Bach, Heilbronn, Germany
Filed Oct. 19, 1964, Ser. No. 404,846
Claims priority, application Germany, Oct. 23, 1963, K 51,153
2 Claims. (Cl. 308—3.5)

The present invention relates to seals for reciprocating machine elements and also for rotating machine elements, and, more specifically, concerns seals which are intended for sealing gases and vapors or liquids as well as liquids having solid materials intermixed therewith and serve as guiding and journalling means.

When sealing rods or the like, heretofore, the two functions, sealing and guiding, were split up, and, more specifically, as a rule, the reciprocating movement was, relative to a liquid or gaseous medium, sealed by a seal, whereas the guiding and journalling of the movable machine element was taken care of by the machine housing or the bearing cover.

Seals have become known according to which the seal has directly connected thereto guiding means behind the place where the rod or shaft leaves a chamber adjacent the medium to be sealed. With this arrangement, however, the guiding means has to be equipped with a lubricating device for which a further seal toward the outside is required. Inasmuch as, for instance with shock absorbers as they are employed with automatic door closing devices and the like, a certain play must be present in the guiding means, it will be evident that even when the play is as small as is permissible, an audible rattling will occur in the bearing means after a short period of use. Furthermore, with arrangements of this type there frequently occurs the difficulty that the medium to be sealed is unsuitable for lubricating purposes. When the medium to be sealed is under pressure, the problem becomes even more difficult to solve. Similar conditions are encountered when sealing, rotating, or oscillating shafts.

It is, therefore, an object of the present invention to provide a seal which will overcome the above-mentioned drawbacks.

It is another object of this invention to provide a seal which will seal any medium involved in arrangements of the type mentioned above, and which will at the same time permit a journalling and guiding of the movable machine part without the necessity of resorting to additional steps or structures.

It is also an object of the invention to provide a seal as set forth in the preceding paragraphs which will greatly aid in eliminating any development of noise.

It is still another object of this invention to provide a seal as set forth above which will be particularly advantageous with small strokes and high frequencies of the rod to be sealed.

These and other objects and advantages of the invention will appear more clearly from the following specifications in connection with the accompanying drawings, in which.

A seal according to the present invention for sealing reciprocating as well as rotating machine elements and for guiding and journalling machine elements is characterized primarily in that adjacent the elastic sealing section there is provided a guiding section of elastic material which guiding section has grooves or cutouts forming the supporting surfaces which are separated from each other and extend in axial direction and assure a play-free guiding of the respective machine part. Due to the elastic yieldability of these supporting surfaces, the diameter of this preferably rib equipped supporting body may be so selected that the machine part to be sealed will engage said supporting surfaces without play whereby any disturbing noise in operation will be safely avoided.

According to a further development of the seal of this invention, it is possible, behind the guiding and bearing sections, i.e. behind that end which is opposite to the place where the bar or shaft passes through, to provide further chambers for receiving a lubricant. Moreover, at the exit of the seal there may be provided a wiper or dust lip in a manner known per se by means of which the lubricating chamber is closed toward the outside and, at the same time, dust or foreign bodies are prevented from entering the guiding section.

By providing a cylindrical section between the sealing lip and the guiding section of the sealing housing, a lateral deviation of the rod or shaft can be kept within desired limits.

Figure 1:
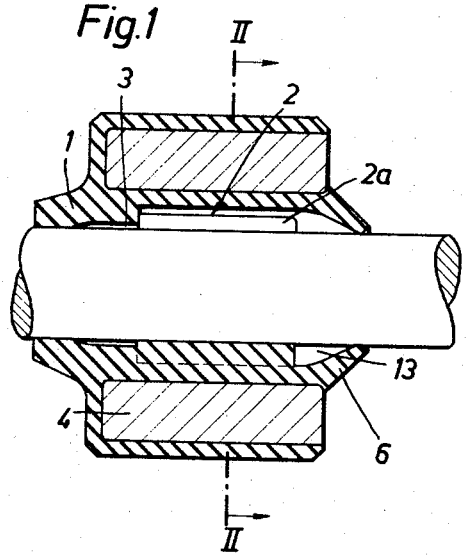
FIGURE 1 is a longitudinal section taken along the line I—I of FIGURE 2 and shows a lip seal according to the invention with longitudinal grooves in a guiding section and also shows a wiper associated with the seal.
Figure 2:
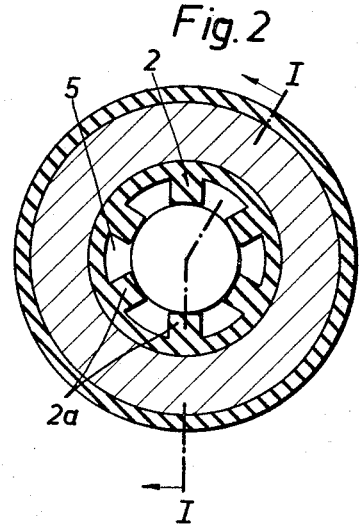
FIG. 2 is a radial section taken along the line II—II of FIGURE 1.

Referring now to the drawing in detail and FIGS. 1 and 2 thereof in particular, the seal shown therein has a lip 1 extending around housing 4. The guiding or bearing means generally desigated 2 has a number of parallel ribs 2a the relative arrangement of which is clearly shown in FIG. 2. The number of these ribs 2a may be selected in conformity with the respective requirements. The ribs may also be shaped differently from the showing in the drawing. The inner surfaces of the individual ribs are, for instance, plane. This arrangement is particularly suitable for a play-free installation. The radial distance between oppositely located ribs or their guiding surfaces is advantageously so selected that it is somewhat less than the diameter of the shaft or rod. In this instance, the ribs will be somewhat deformed during the installation, while' the elastic material of which said ribs are made can escape or deviate into the grooves. In this way, complete freedom of play is assured and any rattling will be avoided.

Between lip 1 and ribs 2 there is a section 3 the diameter of which is somewhat greater than that of the rod or shaft to be sealed by the seal. This cylindrical section brings about that with soft elastic material, deviations of the rod will be limited even under heavy lateral load.

At that side of the rib which is remote from the sealing portion, there is provided a cutout 13 which, similar to the spaces 5 between the profiles, serves for receiving a lubricant. The seal is closed by a lip 6 which acts as wiper.

Figure 3:
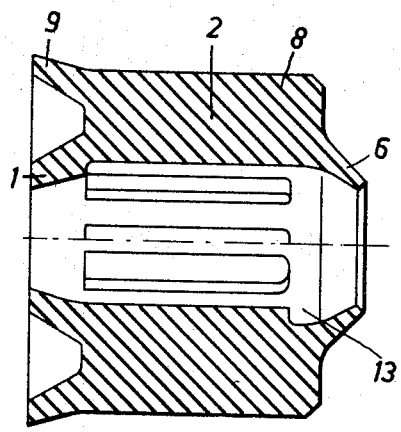
FIG. 3 is a longitudinal section through a modified seal without cylindrical section for limiting escape movements.

When the seal is so designed that any material deviation of the bar or shaft in radial direction is impossible, the cylindrical section may be omitted, and the grooves may be extended up to the lip 1, as shown in the embodiment of FIG. 3.

Figure 4:
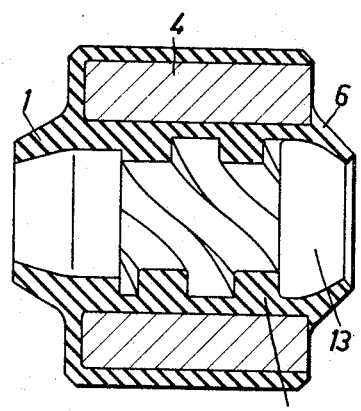
FIG. 4 shows still another embodiment of a seal according to the invention in which the guiding section is provided with spiral grooves.

If an intensive lubrication is required, the grooves may in conformity with FIG. 4 be arranged as spiral grooves. The zones to be supplied with lubricant will, in this instance, be considerably smaller. Their magnitude will be determined by the number of grooves and the pitch thereof. The seal of a groove in conformity with this embodiment is of particular advantage with small strokes and high frequencies of the rod. When longitudinal grooves are employed, to a certain extent also dry-run may occur. The spiral arrangement of the grooves greatly contributes to elimination of noise.

Figure 5:
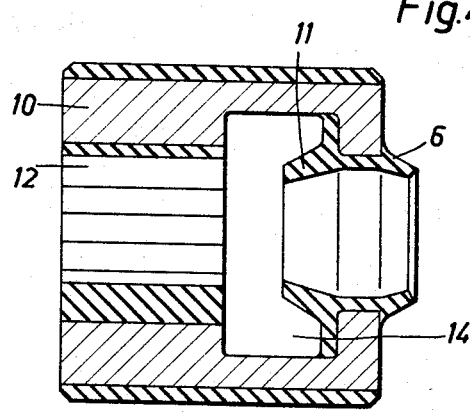
FIG. 5 shows an axial section through a seal in which the play-free journalling section is located ahead of the sealing section.

According to the embodiment of FIG. 5, the bearing section 12 for the rod is located ahead of the seal 6. The bearing section has adjacent thereto an oil chamber 14. With this arrangement the play-free journalling is of particular importance.

A further advantage of the seals according to the invention consists in that with the various embodiments shown in the drawing, a metallic journalling is not required and need not be employed. This fact makes possible a considerably longer life of the seals because no grooves will form. Tests have proved that, indeed, the life of a seal according to the present invention is a multiple of that of metallic seals.

It is, of course, to be understood, that the present invention is, by no means, limited to the particular constructions shown in the drawings, but also comprises any modifications within the scope of the appended claims.

While various types of elastic yieldable materials may be employed for making the sealing and guiding sections of the seal according to present invention, it has proved particularly advantageous to make the said sections of natural or synthetic rubber.

What I claim is:
1. A one-piece sealing and bearing member of resilient material for a reciprocating or rotating machine element, said member comprising an intermediate substantially cylindrical bearing section having internal ribs extending between the ends of said section with their internal surfaces adapted to engage a cylindrical surface of said machine element, a sealing lip at one end of said body having a conical internal surface inclined in one direction outwardly toward its end, said end being smaller in diameter than the internal surfaces of said ribs to form a flexible lip to engage said machine element to provide a seal against external fluids, a wiper section at the opposite end having a conical internal surface inclined in the opposite direction toward its end, said end being smaller in diameter than the internal surfaces of said ribs to form a flexible lip to engage said machine element to provide a seal preventing egress of fluid, a cylindrical section between said ribs and one of said inclined section surfaces, said cylindrical having an internal cylindrical surface slightly greater in diameter than said internal surfaces but smaller in diameter than the surface defined by the bases of said ribs to limit excessive radial movement of said machine element, and a circumferential lubricant chamber adjacent said bearing section and communicating with the spaces between said ribs.

2. A member according to claim 1, in which said internal ribs are helical ribs.

References Cited

UNITED STATES PATENTS

| | | | |
|---|---|---|---|
| 1,254,909 | 1/1918 | Howe | 308—36.1 |
| 1,733,416 | 10/1929 | Lebesnerois | 308—36.1 |
| 1,775,403 | 9/1930 | McLeod | 277—208 |
| 2,157,299 | 5/1939 | Mercier | 277—208 |
| 2,219,519 | 10/1940 | Fabrin | 308—240 X |
| 2,356,027 | 8/1944 | Boyd | 308—36.1 |
| 2,639,198 | 5/1953 | Kirkham. | |
| 2,981,573 | 4/1961 | Reuter | 308—36.1 |
| 2,992,864 | 7/1961 | De Carbon | 308—3.5 |
| 3,025,113 | 3/1962 | Helwig | 308—36.1 |
| 3,076,683 | 2/1963 | Hanley | 308—238 X |
| 3,104,916 | 9/1963 | Dowling | 308—3.5 |
| 3,133,769 | 5/1964 | Drake | 308—36.1 |
| 3,172,335 | 3/1965 | Brooks | 92—166 X |
| 3,243,240 | 3/1966 | Arthur | 308—36.1 |

FOREIGN PATENTS

| | | |
|---|---|---|
| 1,135,279 | 4/1951 | France. |
| 868,393 | 7/1949 | Germany. |

MARTIN P. SCHWADRON, *Primary Examiner.*

DAVID J. WILLIAMOWSKY, *Examiner.*

L. L. JOHNSON, *Assistant Examiner.*